E. HELDERMAN.
SCISSORS AND SHEARS.
APPLICATION FILED MAR. 17, 1908.

903,087.

Patented Nov. 3, 1908.

Witnesses
Hugh H. Ott.

Inventor
Edward Helderman
By Victor J. Evans
Attorney

UNITED STATES PATENT OFFICE.

EDWARD HELDERMAN, OF BRUCEVILLE, INDIANA, ASSIGNOR OF ONE-HALF TO JOHN CUMMINS, OF BRUCEVILLE, INDIANA.

SCISSORS AND SHEARS.

No. 903,087.      Specification of Letters Patent.      Patented Nov. 3, 1908.

Application filed March 17, 1908. Serial No. 421,602.

*To all whom it may concern:*

Be it known that I, EDWARD HELDERMAN, a citizen of the United States, residing at Bruceville, in the county of Knox and State of Indiana, have invented new and useful Improvements in Scissors and Shears, of which the following is a specification.

This invention relates to scissors or shears, and the object of the invention is to provide a device of this character having a pair of spaced stationary blades and a movable blade pivoted between the spaced blades and adapted to be oscillated between and over the spaced blades, thus producing a cutting effect upon each movement of the pivoted blade in either direction.

With these and other objects in view the invention resides in the novel construction of elements and their arrangement in operative combination, hereinafter fully described and claimed.

Figure 1:
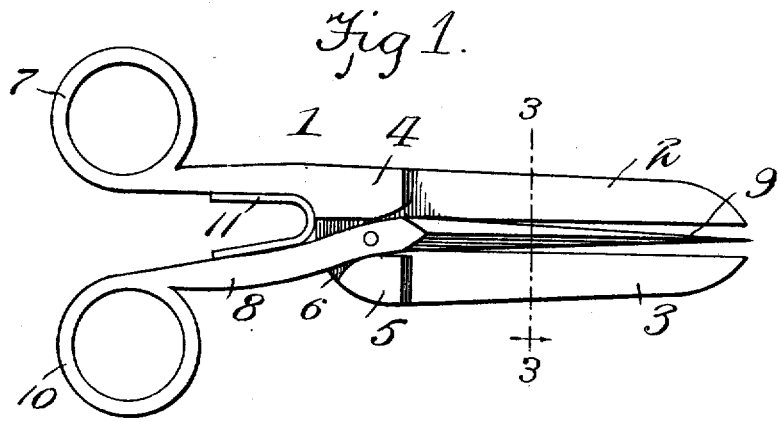
Figure 2:
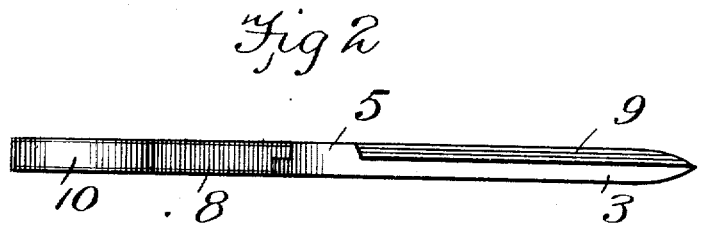
Figure 3:
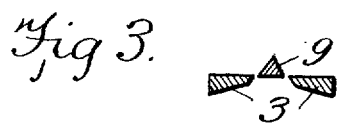

In the accompanying drawings, Figure 1 is a top plan view of a device constructed in accordance with my invention. Fig. 2 is a side elevation of the same. Fig. 3 is a transverse section upon the line 3—3 of Fig. 1.

In the accompanying drawings the numeral 1 designates the stationary member of my improved device. This member 1 is provided with a pair of spaced members 2 and 3. These members 2 and 3 are sharpened at their inner adjacent edges. The members 2 and 3 are provided with suitable enlargements 4 and 5, providing a depression or reduced portion 6 between the blades. The blade 2 is provided with a suitable handle or finger hold 7.

Pivotally connected to the stationary member 1, and positioned between the blades 2 and 3 is the movable element 8. This element 8 is pivoted upon the reduced portion 6 between the enlargements 4 and 5, and comprises a cutting member 9 and a handle member 10. The cutting element 9 is preferably V-shaped as illustrated in Fig. 1 of the drawings, and has both of its edges sharpened.

Interposed between the handle members of the stationary and movable elements is a suitable spring 11. This spring 11 is preferably constructed of a flat U-shaped element as illustrated in Fig. 1 and is adapted to force the edge of the movable element adjacent its pivot against the enlarged portion 5 of the blade 3, and to position the cutting portion 9 of the movable element directly between the spaced blades 2 and 3.

While I have illustrated and described the preferred embodiment of my invention it is to be understood that minor details of construction may be resorted to without departing from the spirit or sacrificing any advantages of the invention.

Having thus fully described the invention what is claimed as new is:

A scissors comprising a stationary member having spaced blades and a handle connected with the blades, the blades being provided with enlargements, and a movable blade comprising a pointed member having sharpened edges pivoted between the enlargements of the stationary member, a handle upon the movable blade, and a spring between the handles of the scissors.

In testimony whereof I affix my signature in presence of two witnesses.

EDWARD HELDERMAN.

Witnesses:
    ROBERT G. HILL,
    LEWIS GOODMAN.